United States Patent Office 3,297,168
Patented Jan. 10, 1967

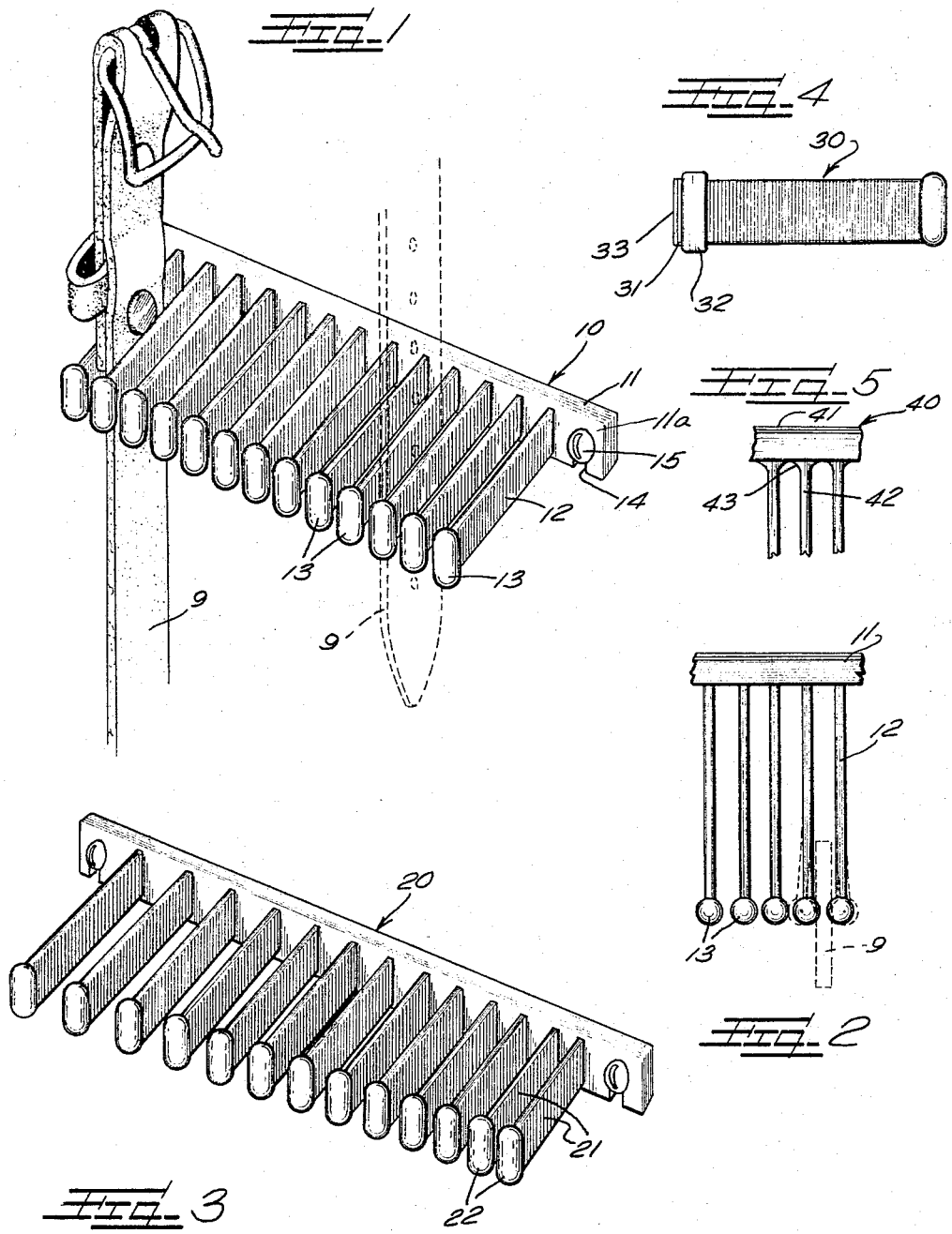

3,297,168
BELT HOLDER
Alexander F. Fleming, P.O. Box 364,
Maywood, Ill. 60153
Filed Dec. 3, 1964, Ser. No. 415,722
2 Claims. (Cl. 211—89)

The present invention relates generally to a holder for supporting belts or other similar articles. The holder may be of several different types with one kind being particularly adapted to support belts of generally uniform width. Another type of holder is also disclosed that is adapted to support belts of varied widths.

In the past, various types of belt holders have been sold which in most instances have been of a relatively complicated structural design and one of the principal objects of this invention is to provide a new and improved belt holder which can be economically manufactured as a one-piece unit.

Another important advantage of the new belt holders here disclosed is that the user can mount a belt on the holder using only one hand by guiding the belt between a pair of the holder arms.

It will therefore be appreciated that an important object of this invention is to provide a new and improved belt holder that can be economically manufactured on a large production basis.

Still another important object of this invention is to provide a new and improved belt holder that can be formed in a molding operation from a suitable synthetic plastic such as polypropylene.

Still another important object of this invention is to provide a belt holder on which the belt can be mounted by the user employing only one hand.

A further object of this invention is to provide a belt holder that can be quickly and conveniently mounted upon a supporting surface such as a wall and the like.

A still another important object of this invention is to provide a belt holder that is adapted to accommodate belts of varied widths or handkerchiefs, napkins, pencils and the like.

According to the important features of this invention, my belt holder is comprised of an attachment plate having a series of arms disposed in parallel spaced relation on one side thereof. Each of the arms has an enlarged area at its outer end. The enlarged areas are spaced relative to one another so that the arms can be moved relative to one another at outer ends to facilitate mounting of belts or other articles on the holder.

Other objects and features of the present invention will more fully become apparent in view of the following detailed description and the accompanying drawings which illustrate several preferred embodiments and in which:

FIGURE 1 is a perspective view showing in full and dotted lines a manner in which belts may be mounted on a belt holder;

FIGURE 2 is an enlarged fragmentary top plan view illustrating in full and dotted lines the manner in which the arms may be deflected to permit assembly and removal of the belt with respect to the holder;

FIGURE 3 is a perspective view illustrating a modified type of belt holder;

FIGURE 4 is a side view of still another modified type of belt holder; and

FIGURE 5 is a view similar to FIGURE 2 but showing a further modified view.

As shown on the drawings:

The reference numeral 9 indicates generally a belt of the type that is adapted to be mounted on my belt holder 10 which embodies important features of this invention. It will be appreciated, of course, that my belt holder can be used to support other articles such as ties and the like if desired.

The belt holder 10 includes an attachment plate 11 having arms 12 carried in parallel relation on one side 11a of the attachment plate 11. The arms are disposed in spaced relation and are formed integral with the attachment plate 11. Enlarged areas 13 are disposed at outer ends of the arms 12 in order to provide means to resist accidental displacement of the belts from the holder. As illustrated, these enlarged areas are of a circular shape as viewed from a top position and are of an elliptical shape as viewed from the front. These enlarged areas 13 are spaced slightly with respect to one another in normal position so that a belt can be easily moved between the arms causing the arms 12 to move relative to one another without interference from adjacently positioned arms.

The attachment plate 11, as illustrated in FIGURE 1, is provided with holes 14 as well as attachment screws 15 which enable the attachment plate to be readily secured to a supporting surface. After the holder has been firmly mounted on a supporting surface, the belts can be freely mounted on the holder 10 either by dropping the tip end of a belt between the arms as is illustrated in dotted lines in FIGURE 1 or by moving the belt between the arms 12 towards the attachment plate 11 as shown by the dotted lines at 9 in FIGURE 2.

In FIGURE 3, there is illustrated a modified belt holder 20. This belt holder 20 is identical to the belt holder 10 except that arms 21 of varied lengths are provided thereon. As illustrated, the shortest arms 21 are disposed at one end of the attachment plate and the longest arms are disposed at an opposite end. It will be noted the arms are of progressively increasing lengths as viewed from end-to-end.

Illustrated in FIGURE 4 is still another modified form of my belt holder identified by the reference numeral 30. The belt holder 30 is provided with a layer of adhesive 31 on a back side of an attachment portion 32. The adhesive may be of any suitable type and is preferably of the type that lends itself for use with a peelable covering strip as identified at 33. The purchaser of the holder 30 can readily mount the holder upon a supporting surface such as a wall by removing the peelable covering strip 33 and by pressing the attachment portion 32 against the wall surface.

Shown in FIGURE 5 is still another modified form wherein I have indicated a holder for belts or other similar articles at 40. The holder 40 includes a base 41 and arms 42 identical to those shown in FIGURE 2 except that a 1/32 inch radius is provided at the juncture of the arms with the base 41 for reinforcing the juncture to permit the arms to flex to provide stress release for the arms 42. It will be noted the radius is provided on opposite sides of each arm 42 at its juncture with the base 41. This feature is preferably used on any of the other forms shown in FIGURES 1–4.

It will be understood that modifications and variations may be effected without departing from the spirit and scope of the novel concepts of the present invention.

I claim:
1. A belt holder comprised of an attachment plate, a series of spaced arms disposed in parallel relation or one side of and integral with said attachment plate the holder being comprised of synthetic plastic mate rial of a flexible type whereby the arms can be spread relative to one another from their outer ends means for securing the attachment plate to a mountin; surface,
said arms each having a substantially rectangular ver tical cross section having a large width to thicknes ratio and a bulged area at its outer end with th bulged areas being cooperable with one another to prevent accidental displacement of belts from between the arms, and each of said bulged areas being slightly spaced from adjacent bulged areas, whereby said spaced arms may deflect to allow the insertion of an item therebetween without interference with an adjacent spaced arm.

2. A belt holder comprised of an attachment plate, a series of spaced arms disposed in parallel relation on one side of and integral with said attachment plate, the arms being of varied lengths to accommodate belts of different widths, the holder being comprised of synthetic plastic material of a flexible type whereby the arms can be spread relative to one another from their outer ends, means for securing the attachment plate to a mounting surface, said arms each having a bulged area at its outer end with the bulged areas being cooperable with one another to prevent accidental displacement of belts from between the arms, each of said bulged areas being spaced consecutively more distant from the attachment plate than the preceding bulged area such that the bulged area at one end of the attachment plate is spaced substantially further from the attachment plate than the bulged area at the other end of the plate, and each bulged area being spaced from each adjacent bulged area by a distance which is less than the spacing between the spaced arms, whereby each bulged area cooperates with each adjacent bulged area to restrict the entry to the space between adjacent arms and to allow a gradually increasing length to the spaced arms.

References Cited by the Examiner

UNITED STATES PATENTS

| | | | |
|---|---|---|---|
| 2,466,195 | 4/1949 | Anderson et al. | 211—89 |
| 2,526,766 | 10/1950 | Ornell | 211—120 |
| 2,572,665 | 10/1951 | Rochow | 211—89 |
| 2,578,134 | 12/1951 | Headrick | 206—.84 |
| 2,765,998 | 10/1956 | Engert | 248—205 |

CHANCELLOR E. HARRIS, *Acting Primary Examiner.*

CLAUDE A. LE ROY, *Examiner.*

W. D. LOULAN, *Assistant Examiner.*